United States Patent

[11] 3,597,868

| [72] | Inventor | James A. Tamborello<br>North Hollywood, Calif. |
|---|---|---|
| [21] | Appl. No. | 808,096 |
| [22] | Filed | Mar. 18, 1969 |
| [45] | Patented | Aug. 10, 1971 |
| [73] | Assignee | Osamu Miyamoto<br>Arcada, Calif.<br>a part interest |

[54] CONVEX SCREEN VIEWBOX
10 Claims, 2 Drawing Figs.

[52] U.S. Cl. ............................................. 40/106.1
[51] Int. Cl. ............................................. G09f 13/10
[50] Field of Search ............................................. 40/106.1, 63 A, 64 A

[56] References Cited
UNITED STATES PATENTS

| 1,803,631 | 5/1931 | Mabee | 40/106.1 |
| 2,704,901 | 3/1955 | Hulse | 40/106.1 |
| 3,120.066 | 2/1964 | Reeves | 35/76 X |
| 3,384,985 | 5/1968 | Bretz et al. | 40/106.1 |
| 3,488,871 | 1/1970 | Jacobs | 40/63 A |

FOREIGN PATENTS

| 579,199 | 7/1969 | France | 40/106.1 |

Primary Examiner—Robert W. Michell
Assistant Examiner—Richard Carter
Attorney—Jackson & Jones ABSTRACT: The invention disclosed herein describes a viewbox having a curvilinear screen for receiving a panoramic radiograph in order to illustrate the anatomical structure depicted on the radiograph in its natural position.

Patented Aug. 10, 1971
3,597,868
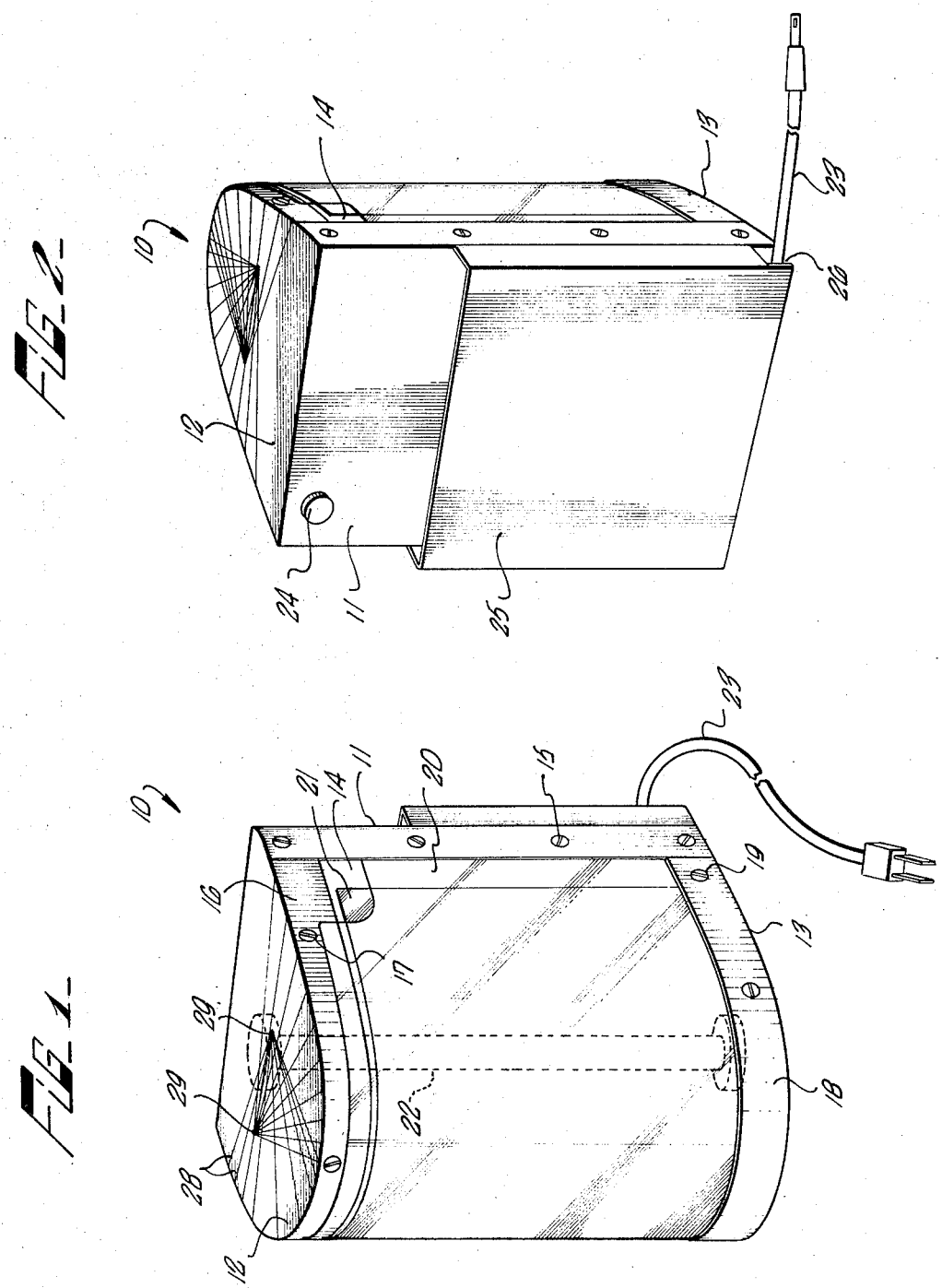
INVENTOR.
JAMES A. TAMBORELLO
BY Jackson & Jones
ATTORNEYS.

CONVEX SCREEN VIEWBOX

BACKGROUND OF THE INVENTION

1. Field of the Invention

This invention relates to viewboxes and more particularly to viewboxes capable of exhibiting panoramic radiographs.

2. Description of the Prior Art

The use of panoramic radiographs in dentistry has been extensive. For example, they are used for diagnostic purposes, for educating dental students, and as a visual aid in patient briefings. Such radiographs are usually made by scanning the X-ray tube and the film about an object to get a continuous scene or depiction of the object. For example, for dental purposes, the X-ray tube and film would be rotated about the patient's head to take a panoramic picture of the patient's jaw and dental structure.

Heretofore, prior viewboxes that are capable of exhibiting panoramic radiographs have suffered from a severe limitation, in that the viewing screens used in exhibiting these radiographs are usually of a flat plane surface. The difficulty encountered in viewing a radiograph from such a screen is the lack of perspective projected to the viewer. A panoramic radiograph, like a photograph, is a depiction of a three-dimensional object. However, unlike a picture which depends on shadings and relative sizes of objects, which enable the viewer to get a perception of depth, the radiograph does not have the qualities that give the illusion of depth. As a result, when viewed from a flat screen, the three-dimensional depiction is flattened out, thereby making it difficult for one to clearly visualize and correlate the relationships of the various elements in juxtaposition.

SUMMARY OF THE INVENTION

This invention obviates the above shortcomings by providing a viewbox which includes a screen having a curvilinear surface to enable the radiograph placed thereon to be viewed in its proper perspective.

The viewbox further includes a sheet of clear plastic which is mounted contiguous to the surface of the screen to enable the radiograph to be conveniently inserted therebetween. Along with the advantage of convenience, the sheet can be used for plotting or outlining thereon any structure or treatment plans by utilizing a wax pencil or the like. Such a method would be an aid in the education of patients or medical students.

The invention thus fulfills a primary object by providing a viewbox capable of exhibiting panoramic radiographs in such a manner as to enable one to more readily and accurately identify images located thereon and to properly orientate them as to their true position.

The features of the present invention which are believed to be novel are set forth with particularity in the appended claims. The present invention both as to its organization and manner of operation, together with further objects and advantages thereof, may best be understood by reference to the following description, taken in connection with the accompanying drawings.

BRIEF DESCRIPTION OF THE DRAWINGS

FIG. 1 is a perspective view of the front face of the convex screen viewbox in accordance with the invention; and FIG. 2 is a perspective view of the rear portion of the convex screen viewbox.

DESCRIPTION OF THE PREFERRED EMBODIMENT

Referring now to the drawings, FIGS. 1 and 2 illustrate a viewbox generally indicated by arrow 10, having a backplate 11, a top cover plate 12, and a baseplate 13. All three may be formed by a single piece of sheet material, or they may be of a three-piece construction with their adjoining ends being connected by suitable attachment means. The backplate 11 is flanged inwardly at its side for receiving the ends of a convex screen 14. The convex screen 14 is of a translucent plastic material and is attached to the flanged edges of the backplate by means of a plurality of screws 15. The top cover plate 12 is also provided with a flanged rim 16 for supporting the top side of the convex screen 14 which extends over it, the convex screen 14 being attached thereto by means of a plurality of screws 17. The faceplate 13 is also provided with a flanged rim 18 which extends over the bottom portion of the convex screen 14, and is attached thereto by means of a plurality of screws 19.

A thin sheet of transparent plastic material is also mounted contiguous to the exterior surface of the screen 14 and is also connected to the flange portions of the backplate 11 by means of the screws 15 and to the bottom flanged rim 18 by means of the screws 19. The upper side of the sheet 20 is unattached to permit a radiograph 21 to be inserted in the space between the convex screen 14 and the sheet 20. The radiograph 21 is a thin layer of film usually illustrating a panoramic view of an anatomical structure.

At least one fluorescent lamp 22 is located within the interior of the viewbox to provide a source of illumination for the screen 14. The backplate 11 is provided with an orifice (not shown) for receiving an electrical cord 23 for connection with the fluorescent lamp 22. An on-switch 24 also extends through the backplate 11 for turning on the fluorescent lamp 22. The backplate 11 also has a flanged wall portion 25 which cooperates with the backplate 11 to form a compartment therebetween for either housing the electrical cord 23 or for receiving and storing other objects, such as the ballast means which is connected to the cord 23. The lower corner of the wall section 25 is apertured at 26 to permit the electrical cord 23 to extend therethrough.

If it is so desired a spring-biased reel may also be rotatably mounted within the compartment. The unused length of cord 23 could then be wound around the reel for storage.

The compartment may also be utilized to house batteries along with the ballast means to enable the viewbox to be completely portable and self-contained.

In operation, the fluorescent lamp 22 provides a source of illumination which lights up the translucent screen 14 to provide an illuminated background for the radiograph 21 which is inserted into the space between the screen 14 and the sheet 20. It should be noted that the upper surface of the screen 14 is smooth and free from obstacles since the flanged rim 16 is located on the interior side of the screen 14 to permit the radiograph 21 to be easily inserted therein.

It should also be noted that the screen 14 is of a convex configuration which in this embodiment approximates the curvature of a human's mandible. A screen of this configuration can thus vividly illustrate the anatomical structure of the human jaw depicted on the radiograph in its natural position.

To assist in the orientation of direction of the X-ray beam with respect to the anatomical structures, seen as images on the radiograph, a plurality of lines 28 are located on the top cover plate 12. These lines 28 emanate from a pair of points 29 on the top cover plate 12 and extend to the outer peripheral edge thereof. The lines 28 may be etched or scribed or placed on the cover plate 12 in any conventional manner. The two points 29 represent the centers of rotation of the radiation source and by noting the direction of the lines 28, one is able to clearly determine the path of the beam at any point on the surface of the screen 14. Such a viewing enables one to clearly visualize and correlate the relationship of the various elements shown in juxtaposition on the radiograph.

Although the viewbox is used to great advantage in exhibiting radiographs, such a device can be conveniently used to illustrate conventional X-ray films. The individual films can be mounted in slots on cardboard taped on clear or plastic sheets for insertion onto the screen 14. In such a manner the various X-rays can still be positioned to illustrate the anatomical structure in its natural position. Therefore, a single viewbox in accordance with the present invention, can be used for a variety of purposes.

What I claim is:

1. A viewbox for exhibiting panoramic radiographs comprising:
   light means for providing a source of illumination;
   a screen having a curvilinear surface being mounted in front of said light means;
   means for mounting the radiograph onto said screen, said curvilinear surface of said screen being convex with respect to said mounting means, and substantially approximates the curvature of a human being's mandible; and
   a cover plate mounted over the top edge of said screen, said cover plate including a plurality of lines located thereon positioned in such a manner as to indicate the paths of the X-ray beam used in producing the radiograph.

2. The invention in accordance with claim 1 wherein said screen is of a translucent plastic material.

3. The invention in accordance with claim 1 wherein said light includes at least one fluorescent lamp.

4. The invention in accordance with claim 3 wherein one side of said sheet is unattached to permit the radiograph to be inserted therethrough.

5. The invention in accordance with claim 3 wherein said transparent material is plastic.

6. The invention in accordance with claim 5 wherein said backplate includes apertures formed thereon for receiving electrical means that are adapted for connection with said light means.

7. The invention in accordance with claim 1 wherein said mounting means includes a sheet of transparent material mounted contiguous to said screen.

8. The invention in accordance with claim 1 further including a backplate mounted behind said light means.

9. The invention in accordance with claim 8 wherein said backplate includes a compartment mounted thereon for receiving and storing a portion of said electrical means.

10. The invention of claim 1 wherein said lines emanate from a pair of points, which represent the centers of rotation of the radiation source, and project radially outwardly to the peripheral edge of the cover plate.